United States Patent [19]
Bilski et al.

[11] Patent Number: 5,698,059
[45] Date of Patent: Dec. 16, 1997

[54] FILTER AND METHOD FOR MANUFACTURING FILTERS

[75] Inventors: Gerard Walter Bilski, Barrington; Edmond Hector Cote, Jr., Warren, both of R.I.; Steven Arthur Hartzell, Greenville; Charles Allen Probasco, New Paris, both of Ohio; Steven Wagstaff Quist, Sandy, Utah

[73] Assignee: AlliedSignal Inc., Morristown, N.J.

[21] Appl. No.: 974,649

[22] Filed: Nov. 10, 1992

[51] Int. Cl.$^6$ .................. B32B 31/26; B32B 29/00; B01D 39/14
[52] U.S. Cl. .................. 156/273.5; 156/273.3; 156/275.5; 156/275.7; 210/493.2
[58] Field of Search .................. 156/273.5, 69, 156/275.5, 272.2, 273.3, 275.7, 293; 210/493.2

[56] References Cited

U.S. PATENT DOCUMENTS

| | | | |
|---|---|---|---|
| 2,726,184 | 12/1955 | Cox et al. | 156/69 |
| 2,739,916 | 3/1956 | Parker | 156/69 |
| 3,164,506 | 1/1965 | Lake | 156/69 |
| 3,879,241 | 4/1975 | Butler | 156/275.5 |
| 4,849,048 | 7/1989 | Inagaki et al. | 156/275.5 |
| 4,880,486 | 11/1989 | Maeda | 156/273.5 |
| 4,916,805 | 4/1990 | Ellrich et al. | 156/273.3 X |
| 5,028,330 | 7/1991 | Caronia et al. | 210/493.2 |
| 5,028,841 | 7/1991 | DiSanto et al. | 156/275.7 X |
| 5,064,494 | 11/1991 | Duck et al. | 156/273.5 |
| 5,154,791 | 10/1992 | Gasser et al. | 156/275.5 X |

OTHER PUBLICATIONS

Thomas Register, Trademark Index, vol. 18, 1992, p. 403.

*Primary Examiner*—James Engel
*Assistant Examiner*—Linda L. Gray
*Attorney, Agent, or Firm*—Howard G. Massung

[57] ABSTRACT

A filter element is assembled by first fixturing the parts together so that the assembly may be manipulated by automated assembly equipment before the end cap sealant is fully cured in an oven which is off-line from the automated assembly equipment. In one embodiment, a plastisol sealant is used, which is "kiss-gelled" by rapidly increasing the temperature of the sealant for a few seconds to cure the sealant sufficiently to permit the assembly to be handled but without fully curing the sealant. The end cap on the other end of the assembly is then installed and kiss-gelled before the completed (but uncured) assembly is transferred to a curing oven where the plastisol at both ends of the assembly is fully cured at the same time. In another embodiment of invention, a small bead or band of an ultravioletly cured polymer sealant is dispensed against adjacent the centertube of the assembly and the ends of the inner tips of the pleats, and a band of conventional plastisol sealant is dispensed on the rest of the end cap. The ultravioletly cured polymer is then cured by ultraviolet light to permit the partially completed assembly to be inverted and a similar end cap installed on the opposite end, before the completed (but uncured) assembly is transferred to an off-line curing oven where the plastisol is fully cured.

14 Claims, 2 Drawing Sheets

FILTER AND METHOD FOR MANUFACTURING FILTERS

This invention relates to liquid filters for filtering the lubricating oil of an internal combustion engine, but it may also be applicable to other types of filters, such as fuel filters and filters used for filtering the combustion air of an internal combustion engine.

BACKGROUND OF THE INVENTION

Liquid filters for filtering lubricating oil of an internal combustion engine consist of a metal housing with a filter element within the housing. The filter element commonly consists of a circumferentially extending cylindrical array of pleated filter paper. Present methods of manufacturing such filter elements require a good deal of hand labor. One end of the array must be embedded in plastisol sealant which is carried on a substantially flat end disc (usually made of paper, but sometimes made of metal). The element must then be manually inverted and another end disc carrying plastisol sealant must be installed on the opposite end of the array. Since the plastisol sealant has not been cured and is still in its viscous state, the assembly must be carefully handled in installing the end disc and sealant, inverting the filter element, and in transferring the assembled filter element with the uncured plastisol sealant into a curing oven. Although automation equipment is available to automatically perform the various steps that have been performed manually, the results were not satisfactory because the machines cannot handle the partially completed element to prevent damage to a significant percentage of the elements being manufactured due to the uncured sealant.

It has been proposed, in order to increase automation and line speeds, to use ultravioletly cured sealant, which cures much more rapidly than the prior art plastisol sealant and therefore can be cured as each end disc is assembled on the filter element. This method of manufacturing filters using such ultravioletly cured sealant is disclosed in U.S. Pat. No. 5,028,330. However, ultravioletly cured sealant is substantially more expensive than common plastisol sealants. Accordingly, while it is desirable to automate filter element assembly lines to eliminate hand labor, it is also desirable to either use the inexpensive prior art plastisol sealants exclusively, or to use only a minimal amount of the expensive ultravioletly cured sealants.

SUMMARY OF THE INVENTION

The present invention relates to an filter element and assembly method for automatic manufacture of such elements, in which only a minimal amount of ultraviolet sealant is used, in which a plastisol sealant is used while still being able to use automated assembly equipment.

These and other advantages of the present invention will become apparent from the following description, with reference to the accompanying drawings, in which:

BRIEF DESCRIPTION OF THE PREFERRED EMBODIMENTS

Figure 1:
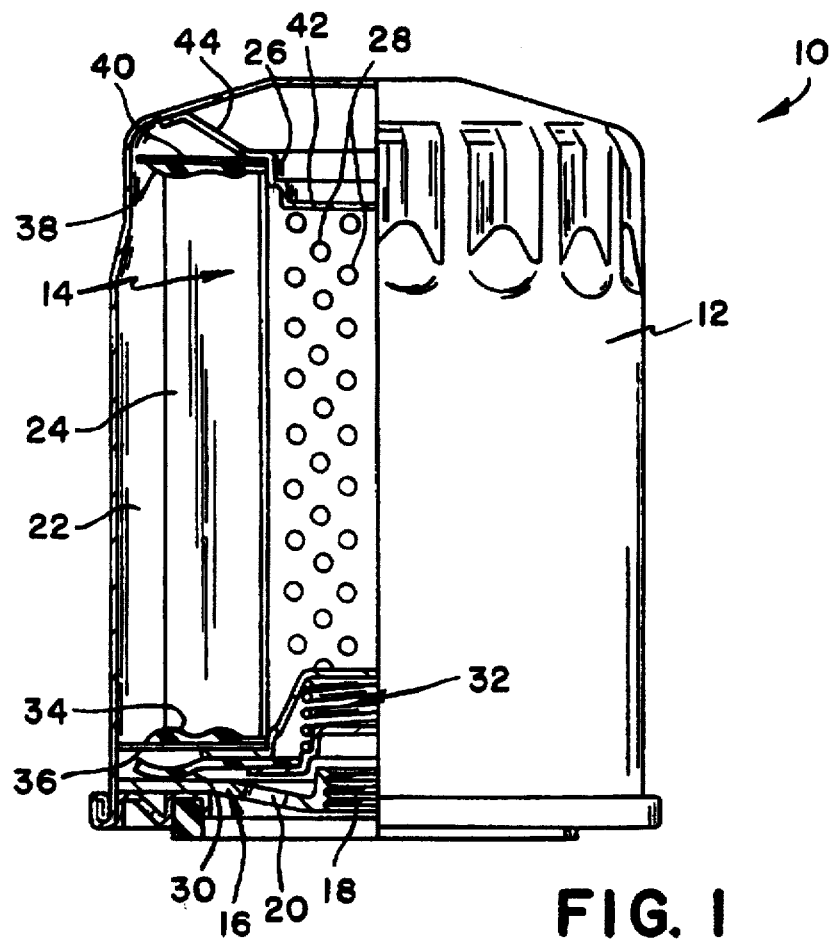
FIG. 1 is a cross-sectional view of an oil filter assembly incorporating a liquid filter made according to the teachings of the prior art.

Referring now to the drawings, a conventional spin-on engine lubricating oil filter is illustrated at 10 in FIG. 1. The filter 10 includes a metal can-shaped housing 12 which defines a cavity therein which receives a filter element generally indicated by the numeral 14. The open end of the metal housing 12 is closed by a tapping plate 16. Tapping plate 16 includes a threaded outlet opening 18, which is adapted to be threaded on a mounting stud (not shown) on a mounting surface of the vehicle engine. Tapping plate 16 further includes circumferentially spaced inlet openings 20 which permit lubricating oil to communicate into an inlet chamber 22 defined between the housing 12 and the outer tips of a conventional cylindrical array of pleated filter paper 24. Inward collapse of the pleated paper array 24 is resisted by a metallic perforated centertube 26 which circumscribes the inner tips of the pleats comprising the array 24. The centertube 26 is substantially cylindrical and defines an outlet chamber communicating with the outlet opening 18. The perforations of the centertube are illustrated as at 28. A conventional anti-drainback valve 30, which prevents lubricating oil from draining out of the chamber 22 back through the inlet openings 16 when the engine is turned off, and a bypass valve generally indicated by the numeral 32, which permits lubricating oil to bypass around the filter element 14 when the pressure across the element 14 reaches an excessive level, is also provided.

The lower end, (viewing FIG. 1) of the array 24 is sealed by a circumferentially extending band of plastisol generally indicated by the numeral 34 which is carried on a substantially flat, annular, end cap 36. The outer periphery of end cap 36 engages the wall of the housing 12 to properly orient the filter element 14 within the housing 12. The upper end of the array 24 is sealed by plastisol generally indicated by the numeral 38 which is dispensed upon an upper end cap 40 which, like the lower end cap 36, is an annular, substantially flat, paper which extends from the centertube 28 radially outwardly across the top of the array 24. The top of the centertube 26 is sealed by a centertube cap 42 of conventional design which incorporates a leaf spring 44 which engages the end of the housing 12, thereby loading the filter element downwardly, viewing the Figure.

Figure 2:
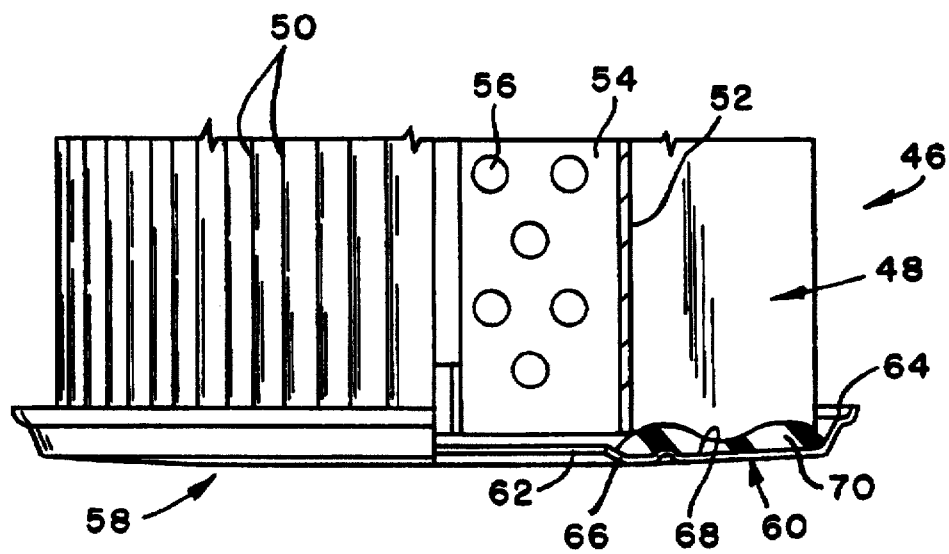
FIG. 2 is a view, partly in section, of a filter element, according to the present invention, used in the liquid filter assembly of FIG. 1 which uses a plastisol sealant.

Referring now to FIG. 2, a filter element 46 is made according to the invention and replaces the filter element 14 of FIG. 1. Filter element 46, as does filter element 14, consists of a circumferentially extending, cylindrical array of radially tapering pleats generally indicated at 48. Each of the pleats tapers radially from an outer tip 50 to corresponding inner tips 52. A metallic centertube 54 includes perforations as at 56 and extends circumferentially about the inner tubes 52 and resists inward collapse of the array 48.

The ends of the array 48 are sealed by an end cap assembly indicated by the numeral 58. End cap assembly 58 consists of a resilient, substantially rigid annular cup-shaped member generally indicated by the numeral 60. The cup-shaped member 60 circumscribes an opening 62 which is coaxial with the centertube 52. The cup-shaped member 60 extends between a circumferentially extending, axially projecting outer lip 64 and a circumferentially extending, axially tapering inner lip 66. Lips 64, 66 cooperate with one another to define a circumferentially extending trough 68 therebetween. A circumferentially extending band of sealant material, generally indicated by the numeral 70, is dispensed into the trough 68. The sealant material 70 is a conventional plastisol compound discussed hereinabove. The trough 68 is wide enough to receive the entire width of the array 48 and also wide enough to receive the centertube, such that the sealing compound 70 seals the end of the pleats and also seals the centertube against the end of the pleats and against the end cap assembly 58.

The cup-shaped member 60 consists of a randomly distributed non-woven array of fibers and a binder resin and is manufactured by conventional paper making process well known to those skilled in the art. The bulk of the fibers, to minimize cost, are normally cellulose fibers, but at least some of the fibers are desirably synthetic fibers, such as polyester fibers, or inorganic fibers, such as fiberglass fibers, in order to give tensile and flex fatigue strength and to also give resiliency and formability. It is also necessary to use a binder resin such as a phenolic, latex, acrylic, epoxy, or polyvinyl alcohol. A typical material would comprise from 50-90% cellulose fibers, 5-20% synthetic fibers, with the remainder resin. The resin provides flexibility to the article, to permit the trough to be formed by molding or other forming processes. If a plastisol seal is to be used, the fiber mixture and resin can be chosen to minimize cost while retaining a sufficient quantity of synthetic and/or inorganic fibers to maintain the necessary strength and sufficient quantity of resin to assure proper moldability.

According to the invention, as will hereinafter be described, when the conventional filter element as illustrated in FIG. 1 is manufactured or when the filter element using a plastisol sealant is dispensed into a cup-shaped trough in the end disc as illustrated in FIG. 2, the sealant is "kiss gelled" by exposing the sealant briefly to a high temperature to gel the sealant before the element is inverted and the end cap on the opposite end is installed. After the end cap on the opposite end is installed, the sealant at the other end of the element is again "kiss gelled" by exposing the sealant to a high temperature for a brief time period to gel the sealant. The gelled sealant permits the assembly to be handled by automated assembly equipment without damage before the plastisol is fully cured in an off-line oven.

Figure 3:
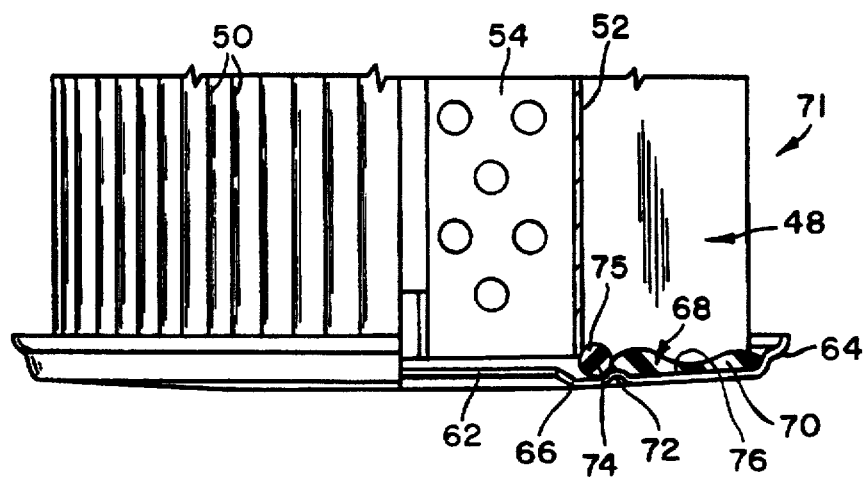
FIG. 3 is a view similar to FIG. 2, but illustrating a filter element in which both ultravioletly cured sealants and plastisol sealants are used.

Referring now to FIG. 3, elements substantially the same as those in the embodiment of FIG. 2 retain the same reference numeral. The filter element 71 of FIG. 3 is substantially the same as that of FIG. 2. However, a axially projecting, circumferentially extending ridge 72 projects into the trough 68 and cooperates with inner lip 66 to define a portion 74 of the trough in which a band or bead 75 of quick curing sealant, such as a photo-initiated polymer, is laid. The photo-initiated polymer may be Ciba Gygi compound XMH-8744. The ridge 72 also cooperates with outer lip 64 to define another portion 76 therebetween in which a band of heat-cured sealant, such as corrosion plastisol sealant 70, is laid down. After the end of the array is installed into the trough, the quick-cured sealant 75 is cured by ultraviolet light while the heat cured sealant received in portion 76 remains uncured. The curing of the quick-cured sealant fixtures the assembly so that it may be handled without damage as will hereinafter be described. The element is, accordingly, then inverted and the other end cap is similarly installed on the opposite end of the array and the quick-curing sealant cured before the completed assembly is transferred into an oven to cure the heat-cured sealant on both ends of the assembly simultaneously.

It is important, of course, in curing the quick-cured sealant that the end cap be transparent to ultraviolet light. It is accordingly important that the resin chosen transmits ultraviolet light in order to cure the sealant. Each resin transmits, absorbs, and reflects light of different frequencies. It has been found that polyvinyl alcohol resin transmits a substantially greater percentage of ultraviolet wave lengths and is the preferred resin. It is also necessary to use relatively fewer fibers in the mixture, hence the fibers tend to reflect or absorb light, and to use a correspondingly higher percentage of polyvinyl alcohol resin, which transmits light.

Figure 4:
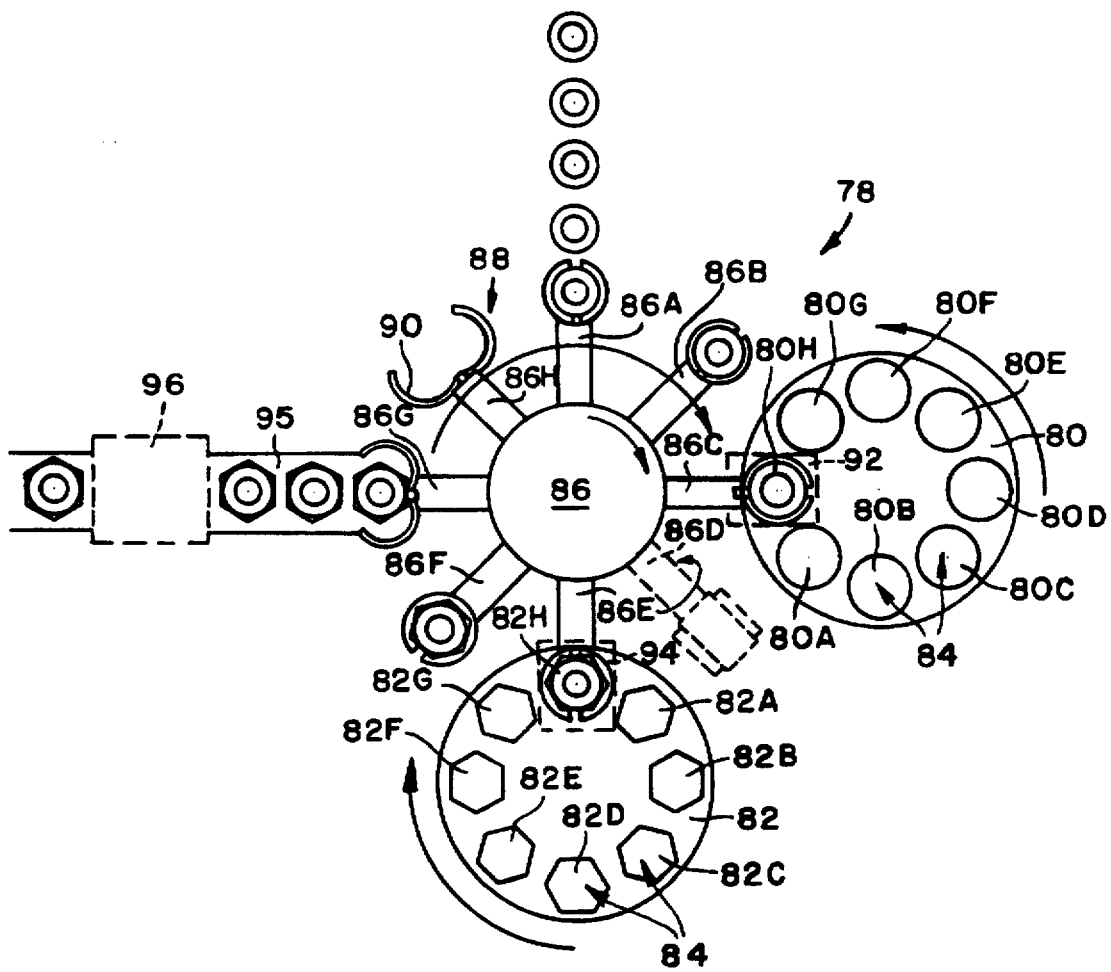
FIG. 4 is a diagrammatic illustration of the dial machines used in the process according to the present invention for manufacturing the filter elements illustrated in FIGS. 2–3.

Referring now to FIG. 4, the method of installing the end caps on the cartridge will now be described in detail. A three-dial indexing dial machine illustrated generally at 78 includes a pair of trays carrying dials 80, 82 which are indexed in the direction of the arrows. Each of the openings in the dials 80, 82 receives a tray 84, if the machine 78 is used to manufacture filter element made pursuant to the teachings of FIG. 3 which uses a ultravioletly cured polymer to fixture the assembly. It is important that the trays be made from a material, such as glass, which is transparent to ultraviolet light. A tray is placed in each of the positions 80A-H on dial 80 and 82A-H of dial 82. Dial machine 78 further includes indexing dial 86 from which arms 86A-H extend. Dial 86 is indexed in the direction indicated by the arrow. Fixtures indicated schematically at 88 are mounted on each of the arms 86A-H. The fixtures 88 include clamshell grippers 90 for picking up, raising, lowering, and releasing the filter elements.

Equipment (not shown) is provided at station 80A of dial 80 and at station 82A of dial 82 for dispensing one of the end caps 36 or 58 onto the tray 84 at that station. Station 80B of dial 80 and 82B of dial 82 is equipped with equipment to dispense a band of sealant into the end cap dispensed at station 80A, 82A. If an ultravioletly cured polymer is to be dispensed into the end cap pursuant to the embodiment of FIG. 3, a conventional device for dispensing such polymer is located at station 80C of dial 80 and at 82C of dial 82. The remainder of the stations around the dials 80, 82, except for station 80H and 82H, are idle stations where the necessary inspections can be performed. A light source indicated at 92 is disposed beneath the dial at this station. The corresponding clamshell gripper 90 deposits the array into the end cap, as will hereinafter be disclosed, on the upper side of the dial. A light source 94 is provided beneath station 82H of the dial 82.

If plastisol is to be used exclusively as sealant and the plastisol is to be "kiss-gelled" a hotplate is disposed beneath the positions 80H and 82H instead of the light source 94 which can be brought up to transmit heat to kiss-gel the plastisol. The heat is transferred through the end cap. The trays 84 are not used in the "kiss-gel" configuration.

The array 48 is picked up by the fixture 88 on the end of one of the arms of the indexing dials 86 and transferred to station 80H of the dial 80. As described above, an end cap assembly 58 into which the appropriate sealant or sealants has been dispensed at stations 80A-C will have already been indexed into position 80H. The fixture 88 then lowers the array onto the end cap assembly 58, embedding the ends of the pleats into the sealant or sealants. If plastisol sealant alone is used, the tray is exposed to a hot plate, and if an ultravioletly cured polymer is also used as a sealant, the light source 92 is switched on to cure the polymer. The partially completed assembly is then picked up by the gripper arm, and the dial 80 is then indexed to the next position. The indexing dial 86 is then rotated toward the 86D position, where the fixture 88 is caused to rotate about the axis of the arm by 180°, to thereby invert the cartridge so that the end cap assembly 58 that has just been installed on the array is on top and the unfinished end of the cartridge is on the bottom. The indexing dial 86 then indexes to the position illustrated at 86E, where an end cap assembly is installed in the opposite end of the array and in the same manner that the dial 80 installs an array on the One end of the array. The indexing dial 86 then passes idle station 86F to release station 86G, where the completed filter assembly (except for the uncured plastisol) is released on a conveyor 95, which transfers the assemblies into a curing oven generally indicated by the numeral 96. The indexing dial arm then passes through idle station 86H before reaching station 86A where another array is picked up and the process is repeated.

We claim:

1. Method of manufacturing a filter element comprising the steps of forming filtering media into a circumferentially extending array having a pair of ends, dispensing a sealant onto an end cap, engaging the end cap with the sealant to one end of the array such that the sealant engages the end of the array, partially curing the sealant for a relatively brief time period to fixture the array and end cap, completing assembly of the filter element, and thereafter fully curing said sealant for a time period greater than the relatively brief time period.

2. Method of manufacturing a filter element as claimed in claim 1, wherein said sealant is a heat cured sealant and said step of partially curing said sealant includes the step of exposing said sealant to a heat source for said relatively brief time period to gel said sealant and said step of fully curing the sealant includes the step of placing said filter element in a curing oven and heating said sealant to a predetermined temperature for a predetermined time period.

3. Method of manufacturing a filter element as claimed in claim 2, wherein said media comprises a circumferentially extending array of pleated filter paper having radially tapering, axially extending pleats each having a tip and a supporting perforate centertube circumscribing an inner circumference of said array to support the inner tips of the pleats, said step of engaging the end cap with the one end of the array including the step of engaging the sealant with an end of the centertube and an end of each of the pleats.

4. Method of manufacturing a filter element as claimed in claim 1, wherein said step of completing assembly of the filter element includes the steps of inverting said array, dispensing the sealant onto another end cap, engaging the other end cap with the sealant to the other end of the array, and partially curing the sealant for a relatively brief time period to fixture the array and end cap before fully curing the sealant at either end of the array.

5. Method of manufacturing a filter element as claimed in claim 4, wherein said sealant is a heat cured sealant and said step of partially curing said sealant includes the step of exposing said sealant to a heat source for said relatively brief time period to gel said sealant and said step of fully curing the sealant includes the step of placing said filter element in a curing oven and heating said sealant to a predetermined temperature for a predetermined time period.

6. Method of manufacturing a filter element as claimed in claim 4, wherein said sealant includes a heat cured component and a second component which is cured by exposing the sealant to a light source and said step of partially curing the sealant includes the step of exposing said second component to a light source, while leaving the heat cured component uncured, to cure the second component.

7. Method of manufacturing a filter element as claimed in claim 6, wherein said media comprises a circumferentially extending array of pleated filter paper having radially tapering, axially extending pleats each having a tip and a supporting perforate centertube circumscribing an inner circumference of said array to support the inner tips of the pleats, the end of each of said pleats having an inner edge adjacent said centertube, said method including the steps of applying a band of said second component around an end of the centertube and the inner edge of said pleats and a band of said heat cured component radially outwardly from said second component.

8. Method of manufacturing a filter element as claimed in claim 7, wherein said end cap is a cup-shaped annular member defining a circumferentially extending trough receiving the corresponding end of the media and the centertube, said method including the steps of dispensing said bands in said trough.

9. Method of manufacturing a filter element as claimed in claim 8, wherein said end cap is made of a material that transmits light, and said method includes the step of transmitting light through said annular member to cure said second component.

10. Method of manufacturing a filter element as claimed in claim 6, wherein said step of curing fully includes the step of placing said filter cartridge in an oven after said second component has been cured for a temperature and a time sufficient to cure the heat cured component.

11. Method of manufacturing a filter element as claimed in claim 1, wherein said sealant includes both a heat cured component a second component which is cured by exposing the sealant to a light source and said step of partially curing the sealant includes the step of exposing said second component to a light source while leaving the heat cured component uncured to cure the second component.

12. Method of manufacturing a filter element as claimed in claim 11, wherein said media comprises a circumferentially extending array of pleated filter paper having radially tapering, axially extending pleats each having a tip and a supporting perforate centertube circumscribing an inner circumference of said array to support the inner tip of each of the pleats, an end of each of said pleats having an inner edge adjacent said centertube, said method including the steps of applying a band of said second component around an end of the centertube and the inner edge of said pleats and a band of said heat cured component radially outwardly from said second component.

13. Method of manufacturing a filter element as claimed in claim 12, wherein said end cap is a cup-shaped annular member defining a circumferentially extending trough receiving the corresponding end of the media and the centertube, said method including the steps of dispensing said bands in said trough.

14. Method of manufacturing a filter element as claimed in claim 13, wherein said end cap is made of a material that transmits light, and said method includes the step of transmitting light through said annular member to cure said second component.

* * * * *